United States Patent Office 2,874,133
Patented Feb. 17, 1959

2,874,133

RADIOPHOTOLUMINESCENT COMPOUND AND METHOD OF MAKING SAME

James H. Schulman, Forest Heights, Md., assignor to the United States of America as represented by the Secretary of the Navy No Drawing. Application December 31, 1956
Serial No. 631,981

3 Claims. (Cl. 260—515)

(Granted under Title 35, U. S. Code (1952), sec. 266)

The invention described herein may be manufactured and used by or for the Government of the United States of America for governmental purposes without the payment of any royalties thereon or therefor.

This invention relates to a new radiation sensitive material, more particularly to a new radiophotoluminescent organic product for the detection and measurement of high energy radiations such as X-rays, gamma rays, high speed electrons, etc., and a method of preparing the same.

Radiophotoluminescence in solids, i. e., luminescence changes produced by exposing the solid to ionizing radiations, has been studied almost exclusively in inorganic systems. Whereas these studies have resulted in practical applications in the field of dosimetry, little attention appears to have been given to the radiophotoluminescence of organic compounds.

The present invention is directed to radiation chemistry in the organic field and has as an object, provision of a new radiophotoluminescent organic product for high energy radiation dosimetry. A further object is to provide a method of preparing a new radiophotoluminescent product. Other objects will become apparent from the description of the invention which follows:

I have found in accordance with my invention that a new radiophotoluminescent organic product useful in high energy radiation dosimetry is obtained when lithium benzoate is treated with benzaldehyde. The treatment may be carried out by neutralizing benzoic acid with lithium hydroxide or carbonate in aqueous solution in known way for the formation of lithium benzoate, but in the presence of benzaldehyde, and crystallizing out the resulting radiation sensitive product. A trace of benzaldehyde in the reactant mixture is effective for producing the new radiophotoluminescent product, on the order of about 0.1 to 1.0% by weight on the benzoic acid sufficing.

The chemical identity of the radiation sensitive product of the invention is not precisely known, nor is the nature of the activity of the benzaldehyde whereby it is produced. It appears that the activity of the benzaldehyde is associated with benzoic acid or the benzoic acid portion of the lithium benzoate molecule and that the reaction product is most probably a benzoin type condensation product. The product was white and crystalline and had the appearance of normal lithium benzoate. Normal lithium benzoate made from lithium hydroxide or lithium carbonate (C. P. grade) and benzoic acid (C. P. grade) is not radiophotoluminescent.

The new organic product of the invention when exposed to ionizing radiation undergoes radiochemical change and will then exhibit an orange luminescence under near ultraviolet light, for example, under 3650A excitation after exposure to X-rays or gamma rays. The intensity of this luminescence, under standard conditions of ultraviolet light inspection, is a function of the dose of the ionizing radiation given to the radiation sensitive product and may be used as a measure of the dose. The new radiophotoluminescent product can be used for the detection and measurement of ionizing radiation at levels of $10^4$ to $10^6$ roentgens employing an appropriate luminescence intensity measuring means. It is superior to the inorganic crystals and glasses heretofore used for ionizing radiation dosimetry in one or more of the following respects: less energy dependence, virtually no fading of the dose indication, and economy in materials and preparation.

For reading of the dose of high energy or ionizing radiation from the new radiophotoluminescent product, one may use either visual comparison with standards of luminescence brightness or photoelectric (fluorimeter) or other means capable of measuring luminescence intensity. The new product may be used in the dosimetry as a powder or pellet which may be in loose form or affixed to a flat support such as a sheet of cardboard, glass, metal or plastic by means of a suitable adhesive such as bone glue or a synthetic resin adhesive, or lodged in a glass or transparent plastic container. It may be imbedded as dispersed fine particles in glass or a solid plastic. A further way in which the new product may be used in the dosimetry is to incorporate it in vehicles serving as paints or inks for labeling the surfaces of articles which are to receive radiation treatment, such as cans of food which are to be sterilized by ionizing radiation.

While in the foregoing description I have described certain embodiments of the method of my invention, it is to be understood that the same are to be taken by way of illustration and not in limitation except as may be defined in the appended claims.

What is claimed is:

1. A method of preparing radiophotoluminescent material which comprises neutralizing benzoic acid with one of the group consisting of lithium hydroxide and lithium carbonate in the presence of water and a trace of benzaldehyde and crystallizing out the resulting product.

2. The crystallized product of reaction from contacting lithium benzoate with a trace of benzaldehyde in the presence of water, said crystallized product being radiophotoluminescent.

3. The crystallized product of neutralizing benzoic acid with one of the group consisting of lithium hydroxide and lithium carbonate in the presence of water and a trace of benzaldehyde, said crystallized product being radiophotoluminescent.

References Cited in the file of this patent

UNITED STATES PATENTS 2,738,429   Goldblith _____ Mar. 13, 1956

OTHER REFERENCES

Beilstein: Vierte Auflage, vol. 9, p. 83 (1949).